(12) United States Patent
Kameyama

(10) Patent No.: US 7,437,687 B2
(45) Date of Patent: Oct. 14, 2008

(54) CELLULAR TELEPHONE SET, OPERATION CONTROL METHOD THEREOF AND PROGRAM THEREFOR

(75) Inventor: Hidehiko Kameyama, Saitama (JP)

(73) Assignee: NEC Corporation, Tokyo (JP)

( * ) Notice: Subject to any disclaimer, the term of this patent is extended or adjusted under 35 U.S.C. 154(b) by 810 days.

(21) Appl. No.: 10/674,341

(22) Filed: Oct. 1, 2003

(65) Prior Publication Data

US 2004/0066421 A1    Apr. 8, 2004

(30) Foreign Application Priority Data

Oct. 4, 2002    (JP)    ............................. 2002-292611

(51) Int. Cl.
  *G09G 5/02* (2006.01)
  *G06F 17/00* (2006.01)
(52) U.S. Cl. ...................... 715/864; 345/619; 345/620; 345/625
(58) Field of Classification Search ............ 348/333.01, 348/308; 345/619, 620, 625; 715/864
  See application file for complete search history.

(56) References Cited

U.S. PATENT DOCUMENTS

| | | | | |
|---|---|---|---|---|
| 5,481,303 A | * | 1/1996 | Uehara ..................... 348/231.1 |
| 5,633,678 A | * | 5/1997 | Parulski et al. ............ 348/231.5 |
| 5,682,197 A | * | 10/1997 | Moghadam et al. ........... 348/36 |
| 5,903,309 A | * | 5/1999 | Anderson ............... 348/333.02 |
| 5,933,137 A | * | 8/1999 | Anderson .................... 715/720 |
| 5,978,016 A | * | 11/1999 | Lourette et al. ............... 348/64 |
| 6,122,411 A | * | 9/2000 | Shen et al. ................... 382/299 |
| 6,232,973 B1 | * | 5/2001 | Dow et al. ................... 715/810 |
| 6,233,015 B1 | * | 5/2001 | Miller et al. ........... 348/333.05 |
| 6,310,648 B1 | * | 10/2001 | Miller et al. ........... 348/333.05 |
| 6,362,851 B1 | * | 3/2002 | Lavelle et al. .......... 348/333.01 |
| 6,377,294 B2 | * | 4/2002 | Toyofuku et al. ............. 348/36 |
| 6,538,698 B1 | * | 3/2003 | Anderson ............. 348/333.05 |
| 6,577,311 B1 | * | 6/2003 | Crosby et al. ............... 345/428 |
| 6,661,454 B1 | * | 12/2003 | Hwang et al. ............ 348/231.1 |
| 6,885,395 B1 | * | 4/2005 | Rabbani et al. .......... 348/231.1 |

(Continued)

FOREIGN PATENT DOCUMENTS

EP    0 898 405    2/1999

(Continued)

OTHER PUBLICATIONS

Eastman Kodak: "User's Guide Kodak DX3500 Digital Camera", Eastman Kodak Company, 2001, XP-002267633, pp. 1-84.

*Primary Examiner*—Rachna Desai
*Assistant Examiner*—Gregory A Distefano
(74) *Attorney, Agent, or Firm*—Young & Thompson

(57) ABSTRACT

A cellular telephone set can simplify operation when a picture (picture memorandum) picked-up as memorandum is registered in a memory and reproduced. Upon initial registration of an image to a memory for the picture memorandum, a picture memorandum icon is generated and displayed by a CPU. In subsequent registration of images, a user is not required for a particular operation. Upon reading out the registered images, the first registered image is displayed on the waiting screen image by selecting the picture memorandum icon on the display portion. If the user wants to see a necessary image other than the display image, the registered images are displayed on the waiting screen image sequentially by operating the cursor key. Therefore, the desired image can be easily extracted.

19 Claims, 5 Drawing Sheets

U.S. PATENT DOCUMENTS

| | | | |
|---|---|---|---|
| 6,957,040 B1 * | 10/2005 | Tanaka | 455/3.06 |
| 7,068,316 B1 * | 6/2006 | Pine | 348/308 |
| 7,130,394 B2 * | 10/2006 | Koyama et al. | 379/93.23 |
| 7,154,534 B2 * | 12/2006 | Seki et al. | 348/207.1 |
| 7,193,646 B1 * | 3/2007 | Shioji | 348/220.1 |
| 7,233,356 B2 * | 6/2007 | Nagao | 348/333.02 |
| 7,308,158 B2 * | 12/2007 | Herbert et al. | 382/298 |
| 2003/0009281 A1 * | 1/2003 | Whitham | 701/211 |
| 2003/0095193 A1 * | 5/2003 | May et al. | 348/231.3 |
| 2003/0218682 A1 * | 11/2003 | Lim et al. | 348/333.11 |
| 2004/0016814 A1 * | 1/2004 | Muramatsu | 235/462.41 |
| 2004/0051784 A1 * | 3/2004 | Ejima et al. | 348/207.99 |
| 2004/0201692 A1 * | 10/2004 | Parulski et al. | 348/207.1 |
| 2004/0267793 A1 * | 12/2004 | Sato | 707/100 |
| 2005/0083351 A1 * | 4/2005 | Kawamoto et al. | 345/660 |
| 2005/0231648 A1 * | 10/2005 | Kitamura et al. | 348/734 |

FOREIGN PATENT DOCUMENTS

| | | |
|---|---|---|
| EP | 975132 A1 * | 1/2000 |
| JP | 09331495 A * | 12/1997 |
| JP | 11-69214 | 3/1999 |
| JP | 11-205761 | 7/1999 |
| JP | 2001-503216 | 3/2001 |
| JP | 2001-272966 | 10/2001 |
| JP | 2001-345895 | 12/2001 |
| KR | 10-0323759 | 2/2002 |

\* cited by examiner

CELLULAR TELEPHONE SET, OPERATION CONTROL METHOD THEREOF AND PROGRAM THEREFOR

CROSS REFERENCE TO THE RELATED APPLICATION

The present application has been filed claiming priority based on Japanese Patent Application No. 2002-292611, filed on Oct. 4, 2002. Disclosure of the above-identified Japanese Patent Application is herein incorporated by reference.

BACKGROUND OF THE INVENTION

1. Field of the Invention

The present invention relates generally to a cellular telephone set, an operation control method therefor and a program therefor. The invention relates to a cellular telephone set installed with a camera and having an image pick-up function, an operation control method therefor and a program therefor.

2. Description of the Related Art

Among recent cellular telephone sets, there are some with installed cameras and thus having functions for picking-up images, processing the images for storing as an album or transmitting to communication counterparts as attachments to electronic mails. As one way of use of such image processing functions, it has been considered to use a picked-up image as a memorandum, for example. Namely, it has been considered to pick-up an image of a time-table of public transportation, such as a bus, train, a sub-way or the like at a bus station or a train station by means of the camera of the cellular telephone set to store as a memorandum for reading out later to check as necessary.

In this case, it is usually not possible to pick-up the image of the overall time-table at one shot of the camera of the cellular telephone set. Therefore, it is typical to pick-up the image of one time-table by several separate shots to be stored as a plurality of images. In the case of the time-table, there is one for weekday and another for Sunday and holidays. Therefore, if both time-tables are to be stored, the number of the picked-up images to be stored is increased.

Then, it becomes necessary to store a plurality of picked-up images in a memory. In such case, it becomes necessary to perform an image pick-up operation and a registering operation for each image. On the other hand, upon checking the images dividedly registered, it becomes necessary to read out the registered images one by one. This has been known from Instruction Manual of J-SH08, Basic Operation, pages 50 to 53, issued by J-Phone Kabushiki-Kaisha, December, 2001, for example.

When the images of the time-table are picked-up and stored in the memory as memorandum and are read out for checking later, it is inherent to divide the image into a plurality of images to make the registering operation and the reading out operation troublesome. On the other hand, when the user wants to see one of a plurality of the registered images, for example, when the user wants to see one time zone in the time-table, it becomes difficult to find the desired one of the registered images, the user has to repeat the reading out operation until the desired image is displayed. Furthermore, owing to the increasing of the capacity of built-in memory and adding on of external memory, the number of images to be the object for retrieval is increased to inherently increase the number of times of the reading out operation.

When a plurality of images are registered in the memory, it can be considered an approach to establish correspondence with icons (symbol character) for an index for respective registered images for displaying the icons in the upper and/or the lower portions of a display screen so that the corresponding icon can be selected when the user selectively reads out the desired image. However, such method requires icons per the registered images to cause increasing of the load on the control portion (CPU). Also, the number of icons to be displayed on the display screen is limited, the number of registered images is also limited accordingly.

SUMMARY OF THE INVENTION

It is an object of the present invention to provide a cellular telephone set and an operation control method which can make the registering and reading out operation of images of picked-up memorandum quite simple and thus can reduce a user's load.

Another object of the present invention is to provide a cellular telephone set and an operation control method which permits reading out of the desired one of a plurality of registered images by quite simple operation.

A further object of the present invention is to provide a cellular telephone set and an operation control method which enables registration of a plurality of picked-up images with a single icon to prevent increasing the number of icons in proportion to the number of the registered images.

In order to accomplish the above-mentioned objects, according to the first aspect of the present invention, a cellular telephone set having a camera and a display portion comprises:

a memory means for registering images picked-up by the camera; and a registration control means for generating an icon indicating that images are registered upon initially recording the picked-up images in the memory, displaying the icon on the display portion, and registering subsequently picked-up images in association with the icon.

The cellular telephone set may further comprise a display control means for controlling the display of the icon on the display portion. Also, the cellular telephone set may further comprise a read-out control means for reading out one of the mages registered in the memory in response to a selecting operation of the icon on the waiting screen image to display on the waiting screen image.

The read-out control means may sequentially read out other images registered in the memory to display on the waiting screen image according to cursor operation on the display portion. A size of images registered in the memory may be equal to an image size of the waiting screen image. The memory may have a fixed capacity. The cellular telephone set as set may further comprise a means for generating an alarm when a registration amount in the memory reaches the maximum registration amount of the memory.

According to the second aspect of the present invention, a method of controlling the operation of a cellular telephone set having a camera and a display portion, comprises:

a registration control step of generating an icon indicating that images are registered upon initially recording the picked-up images in a memory, displaying the icon on the display portion, and registering subsequently picked-up images in association with the icon.

The operation control method may further comprise a display control step of controlling to display the icon on the display portion. Also, the operation control method may further comprise a read-out control step of reading out one of images registered in the memory in response to a selecting operation of the icon to display on the waiting screen image.

In the read out control step, other images registered in the memory are sequentially read out to display on the waiting screen image according to cursor operation on the display portion. The size of images registered in the memory may be equal to an image size of the waiting screen image. The operation control method may further comprise step of generating an alarm when a registration amount in the memory reaches the maximum registration amount of the memory.

According to the third aspect of the present invention, a program for making a computer execute a method of controlling operation of a cellular telephone set having a camera and a display portion, comprises:

a registration control step of generating an icon indicating that images are registered upon initially recording the picked-up images in a memory, displaying the icon on the display portion, and registering subsequently picked-up images in association with the icon.

Operation of the present invention will be discussed. In a so-called picture memorandum function using an image or images picked-up by the camera as memorandum, the memory for the picture memorandum is provided, upon registering the image for the picture memorandum in the memory, the picture memorandum icon is generated automatically upon initial registration to display as a desktop icon, and upon subsequent registration of the picture memorandum, images are registered in the memory sequentially in association with the icon without generating any further icon. Therefore, the picture-memorandum can be registered easily.

Upon reading out the picture memorandum, one of the picture memorandum is read out and displayed on the waiting screen image by selecting the picture memorandum icon among the desktop icons on the waiting screen image. When the user wants to select the desired picture memorandum, other registered picture memorandum is displayed sequentially one by one in response to cursor operation to permit easy selection of the desired picture memorandum.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are only for explanation and understanding.

In the drawings.

DESCRIPTION OF THE PREFERRED EMBODIMENT

The present invention will be discussed hereinafter in detail in terms of the preferred embodiment of a cellular telephone set, an operation control method therefor and a program therefor according to the present invention with reference to the accompanying drawings. In the following description, numerous specific details are set forth in order to provide a thorough understanding of the present invention. It will be obvious, however, to those skilled in the art that the present invention may be practiced without these specific details.

Figure 1:
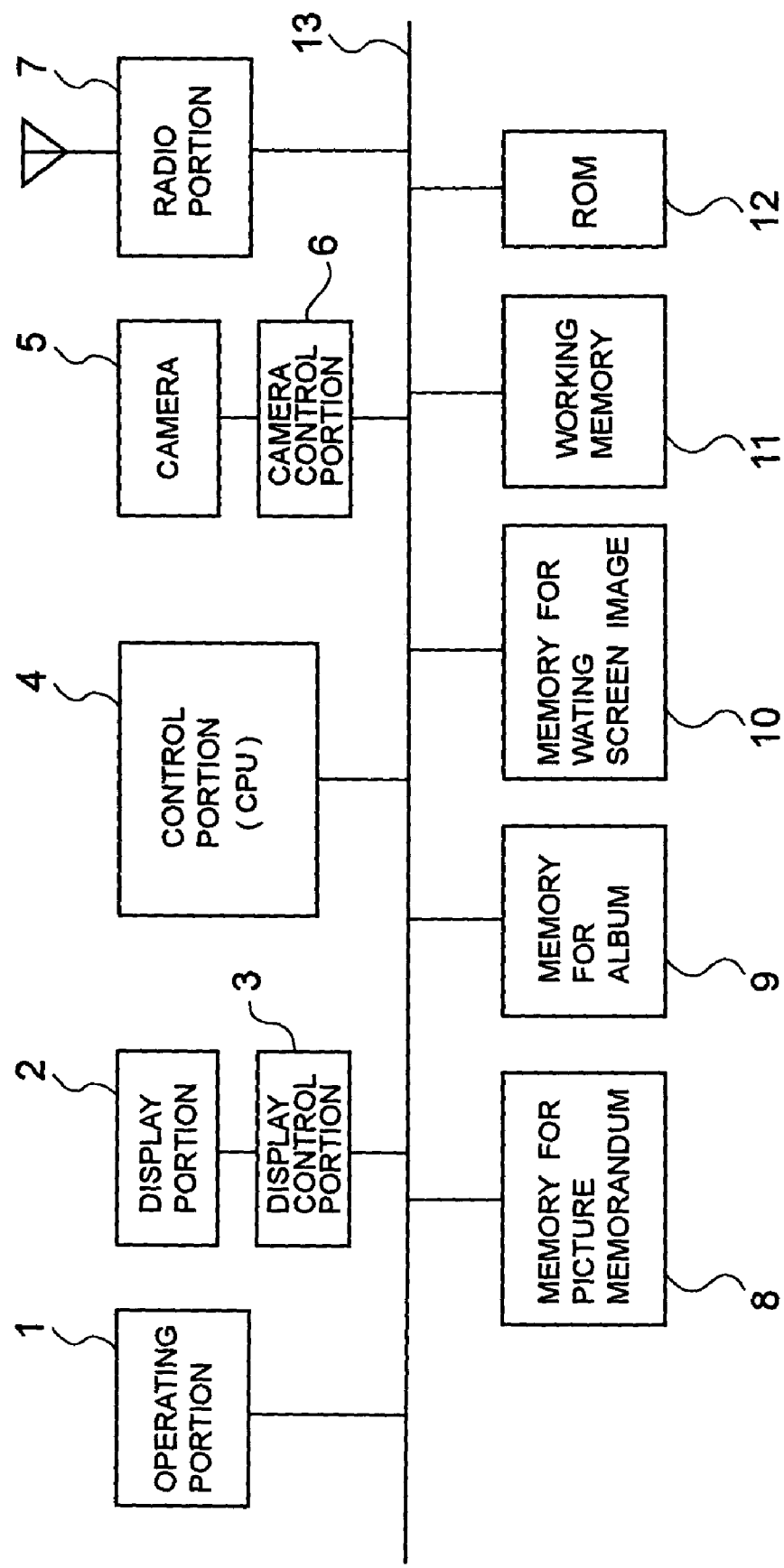
FIG. 1 is a functional block diagram showing the preferred embodiment of the cellular telephone set according to the present invention.

FIG. 1 is a functional block diagram showing the preferred embodiment of the cellular telephone set according to the present invention. Referring to FIG. 1, an operating portion 1 is a key operating portion where various operation keys are arranged. A display portion 2 is formed from an LCD (liquid crystal display unit) and is consisted of a main LCD and a subsidiary (back side) LCD. The main LCD is provided at a position in opposition to the user, and the subsidiary LCD is provided at a position on back side of the main LCD. A display control portion 3 performs display control of the display portion 2 consisting of the main LCD and the subsidiary LCD.

The control portion 4 is a CPU and performs control for respective portions shown in FIG. 1. For this purpose, the control portion 4 performs control for respective portion by operation according to procedure of a program stored in a ROM 12. A camera 5 is mounted on the same surface with the subsidiary LCD and is controlled by a camera control portion 6. A radio portion 7 has a function for performing radio communication with a radio base station (not shown). These portions are mutually connected through buses 13.

In FIG. 1, memories 8 to 12 illustrated on the lower side of the bus 13 are storage medium, wherein the memory 8 that the picture memorandum is the memory to be used in the present invention and will be discussed in detail later. The memory for album 9 is a memory for storing the images picked-up by the camera 5 for the album. The memory 10 for the waiting screen image is a memory for storing the waiting screen images. A working memory 11 is a work memory to be used in the process of CPU 4. It should be noted that ROM 12 is a read-only memory storing the program for operating CPU 4.

In FIG. 1, the memory 8 for the picture memorandum is a memory to be used for registering the images picked-up by the camera as memorandum and is provided separately from the memory 9 for the usual album. The memory 8 for the picture memorandum becomes active when a picture memorandum function is selected to register the picked-up image. A size (capacity) of the picked-up image of the memory 8 is the same as a size of the waiting screen image (as stored in the memory 10 for the waiting screen image) and has a fixed zooming magnification. It should be noted that the waiting screen image is a given fixed size. Therefore, the memory 10 for the waiting screen image has a fixed capacity. On the other hand, the picked-up images to be stored in the memory 9 for the album have a plurality of kinds of sizes and have variable zooming magnification similarly to the prior art.

Figure 2:
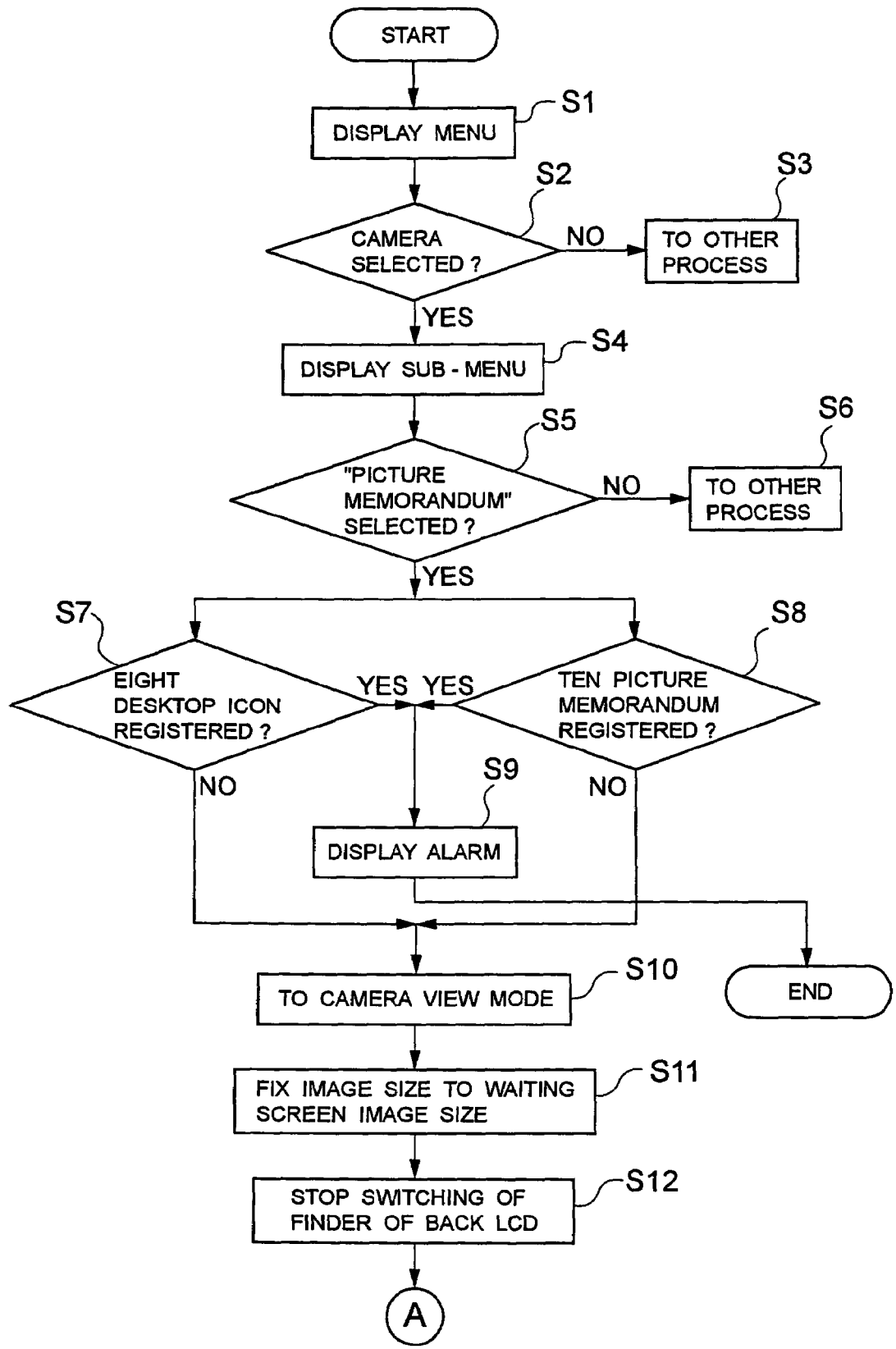
FIG. 2 is a flowchart showing operation of the picture memorandum registration operation in the preferred embodiment of the cellular telephone set according to the present invention.
Figure 3:
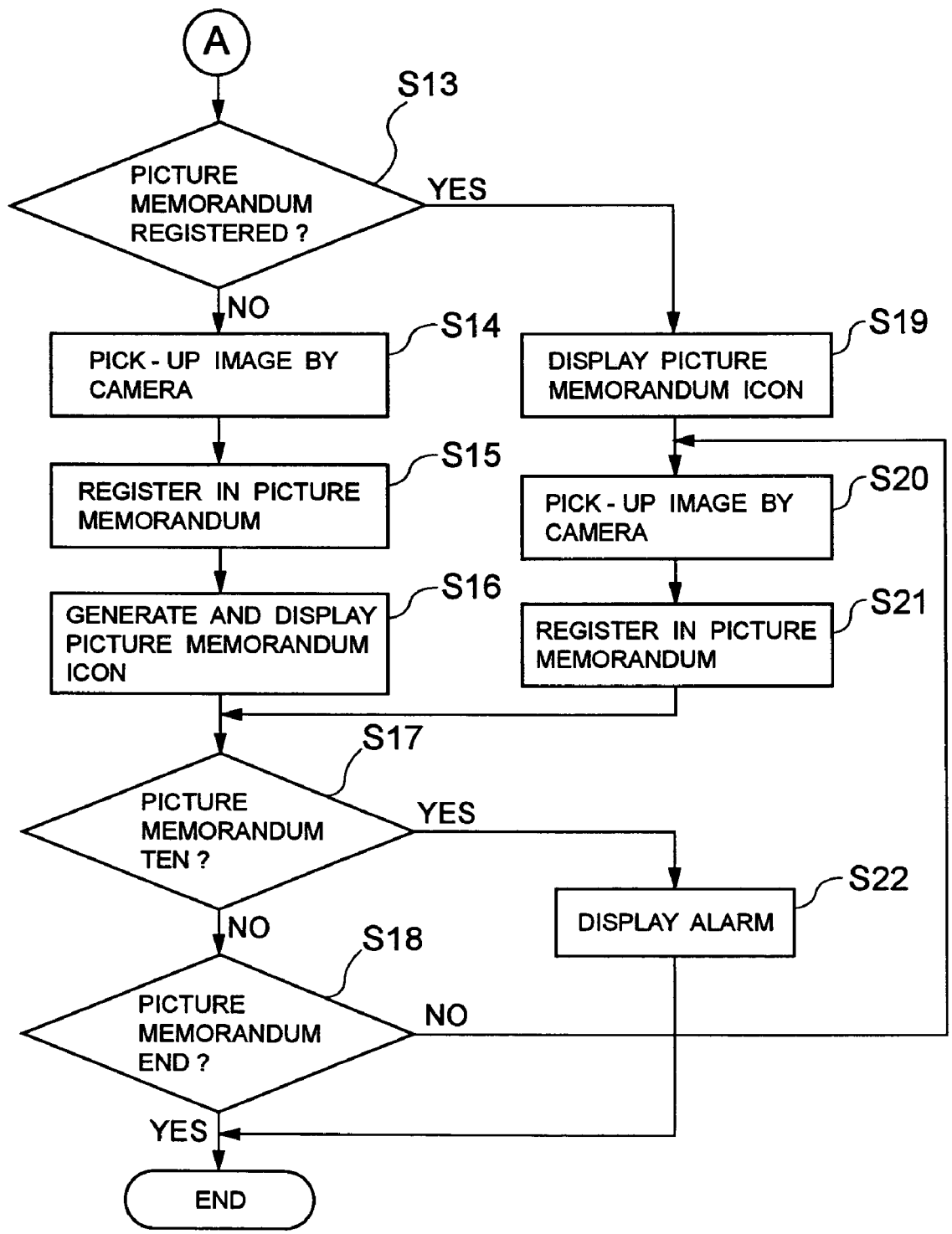
FIG. 3 is a flowchart showing operation of the picture memorandum registration operation in the preferred embodiment of the cellular telephone set according to the present invention.

FIGS. 2 and 3 are flowcharts showing operation upon selecting the picture memorandum function in the preferred embodiment of the present invention. In a condition where a menu is displayed on the display portion 2 (step S1), if the user selects "camera" (step S2), a sub-menu is displayed in response thereto (step S4), It should be noted that, when a mode other than "camera" is selected at step S2, the selected process is performed (step S3).

Figure 4:
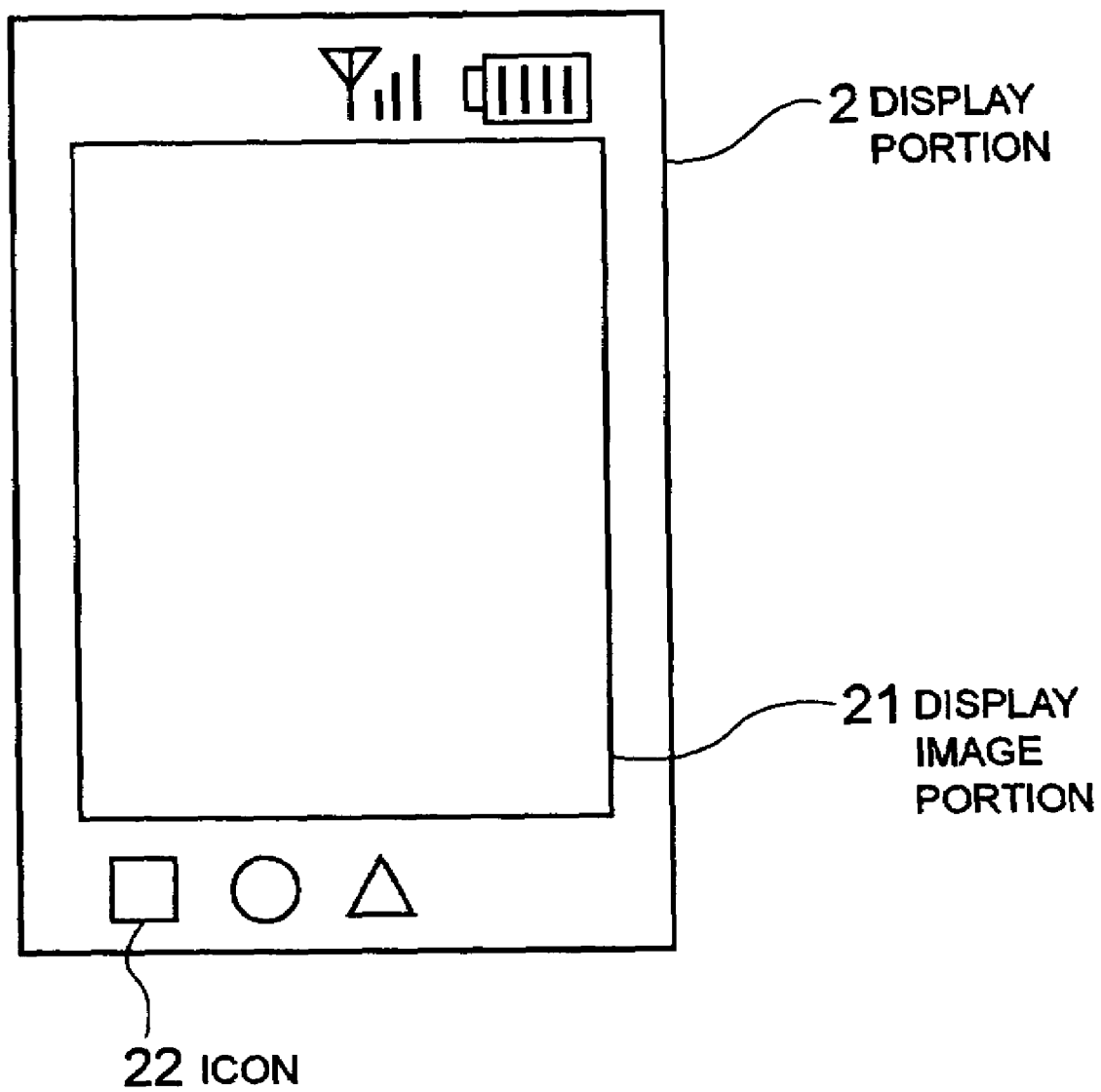
FIG. 4 is an illustration showing an example of display in a display portion in the cellular telephone set.

In the condition where the sub-menu is displayed, when the user selects "picture memorandum" (step S5), a check is made whether eight desktop icons are already registered or not in response thereto (step S7). The desktop icon includes various icons 22 to be displayed on a lower portion of the display image portion 21 as shown by the example display in FIG. 4. Due to restriction in the display portion 2, eight icons can be registered at the maximum, for example. Therefore, when eight already registered icons are present, newly registering the icon for the picture memorandum becomes impossible. Therefore, checking at step S7 is performed. If the answer at step S7 is YES, an alert message, such as "desktop is full and no further icon can be attached" is displayed (step S9). It should be noted that, at step S5, if a mode other than "picture memorandum" is selected, the selected mode of process, such as picking-up of normal picture is performed (step S6).

At the same time, a check is performed whether the already registered images in the memory 8 for the picture memorandum are ten or less (step S8). In the memory 8 for the picture memorandum, ten images can be registered at the maximum, for example, due to limitation of memory capacity. Therefore, a judgment is made at step S8. If the answer at step S8 is positive (YES), alarm message "picture memorandum is full and cannot be registered any further", is displayed (step S9). It should be noted that at steps S7 and S8, if the answers in these steps are both positive (YES), an alarm message indicating that the picture memorandum is full is displayed preferentially.

When answers at steps S7 and S8 are both negative (NO), operation mode transits to a camera view mode for picking-up a picture memorandum (step S10), and the image size is fixed at the waiting screen image size (step S11). Then, switching of finder of the subsidiary LCD provided on the back surface is disabled (step S12). The reason is that during active state of the picture memorandum function, picking-up of an image of the object, such as time-table or the like, is performed by directing the camera on the same surface with the subsidiary LCD on the back surface, and at this time, the main LCD forming the display image portion 21 of the display portion 2 shown in FIG. 4 serves as the function of the finder.

Next, a check is performed whether the picture memorandum is already registered (in the memory 8 for the picture memorandum) (step S13). If not registered, picking up of the image by the camera is performed (step S14). The picked-up image is then registered in the memory 8 for the picture memorandum (step S15). At this time, since registration to the memory 8 for the picture memorandum (picture memorandum registration) is the first time, a picture memorandum icon (title is picture memorandum) is generated automatically at this timing and an icon 22 is additionally attached to the lower portion of the display image portion 21 shown in FIG. 4 (step S16).

This picture memorandum icon is an icon indicating that the picture memorandum is registered in the memory 8 for the picture memorandum. Upon subsequent registration of the picture memorandum, icon generation is not performed, and the picture memorandum icon generated upon registration of the picture memorandum at the first time, is used for registration of the picture memorandum up to maximum number of registration of picture memorandum determined depending upon the capacity of the memory 8. Accordingly, with the picture memorandum icon, ten picture memorandum at the maximum can be registered in the memory 8 in association with the icon.

Since the maximum number capable of register as picture memorandum is ten, checking of the registration number is performed (step S17). When registration number reaches ten, as long as operation for termination of picture memorandum is not performed (step S18), picking-up of next picture memorandum and registration process are continued (process of steps S20, S21, S17 and so forth).

In the foregoing step S13, if the picture memorandum registration is performed, as set forth above, the picture memorandum icon generated before (step S16) is displayed using as it is (step S19). Subsequently, processes at steps S20 and S21 are performed. If the number of registration of the picture memorandum exceeds ten at the maximum, the alarm message "picture memorandum is full and cannot be registered" and so forth is displayed (step S22).

Figure 5:
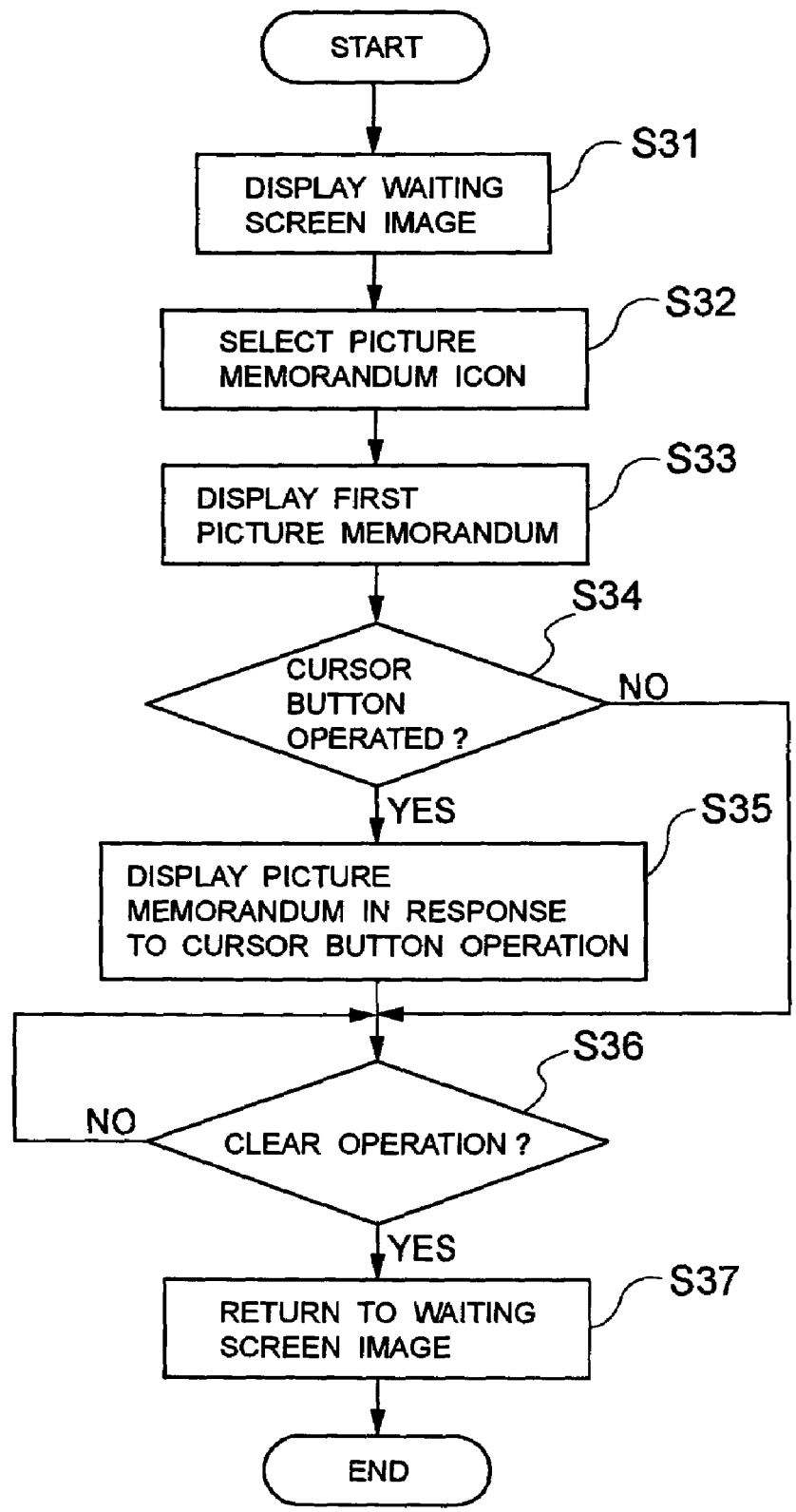
FIG. 5 is a flowchart showing operation of the picture memorandum reading out operation in the preferred embodiment of the cellular telephone set according to the present invention.

Operation for reading out and displaying the picture memorandum registered as set forth above, is shown in the flowchart of FIG. 5. Referring to FIG. 5, during display of the waiting screen image (step S31), when the picture memorandum icon is selected by the user among icons 22 attached on the lower portion of the display image portion 21 of FIG. 4 (step S32), the image of the first picture memorandum is read out from the memory 8 for the picture memorandum in response to the user's selection and is displayed overlaying over the display image portion 21 (see FIG. 4) of the waiting screen image (step S33).

Upon retrieving the picture memorandum desired by the user, by operating a cursor key (key with arrow mark directed up, down and left, right), the image corresponding to the picture memorandum registered in the memory 8 for the picture memorandum is displayed on the waiting screen image one by one according to movement of the cursor (step S35). By stopping cursor operation when the picture memorandum desired by the user is displayed, the desired picture memorandum is displayed on the waiting screen image. In response to a clear operation (step S36), display is returned to the waiting screen image (step S37), and then the process is terminated.

It should be noted that by deleting the image in the memory 8 for the picture memorandum, the operation mode transits to a camera view mode upon picking-up of the picture memorandum (step S10).

As set forth above, in the picture memorandum function, in which the image picked-up by the camera is used as memorandum, the memory for the picture memorandum is provided. Upon registering the image for the picture memorandum in the memory for the picture memorandum, and upon initial registration, the icon for the picture memorandum is generated automatically to display as the desktop icon. Upon subsequent registration of the picture memorandum, further icon generation is not performed, and images are sequentially registered in the memory for the picture memorandum in association with the initially generated icon. Therefore, the load on the CPU may not be increased upon the registration of the picture memorandum, and the operation to be performed by the user can be quite simple.

On the other hand, upon reading out the picture memorandum, by operating the picture memorandum icon among the desktop icons in the waiting screen image, the registered image of one picture memorandum is displayed on the waiting screen image. Subsequently, when the user has desired picture memorandum to see, the registered images are read out sequentially by using the cursor key. Therefore, the operation to be performed by the user upon reading out the image from the picture memorandum, can be quite simple. Furthermore, by providing the memory 8 for the picture memorandum separately from the album memory, picking-up of the picture memorandum becomes possible irrespective of the use condition of the memory 9 for album. By this, the capacity of the memory 8 for the picture memorandum can be fixed to make it unnecessary to perform a process for dynamically adjusting memory region for using with the memory 9 for the album.

It should be appreciated that, in the foregoing embodiment, the maximum number of the images to be registered in the memory 8 for the picture memorandum is ten and the maximum number of the desktop icons to be attached on the display image portion is eight. However, these numbers are considered as mere examples and can be selected arbitrarily. On the other hand, the embodiment shown in FIG. 1 is designed to provide the memory 8 for the picture memorandum and the memory 9 for the album mutually independent of each other, it may also be possible to form these memories with a single memory divided into a plurality of regions. Similar is true in the case of the memory 10 for the waiting screen image. Furthermore, the image to be read out from the memory 8 when the picture memorandum icon is selected, is not specified to the first image registered at first but can be other image.

Processes shown in FIGS. 2, 3 and 5 may be preliminarily stored in ROM 12 in a form of program or programs, and can be executed by CPU with reading out the program or programs.

It is the first effect of the present invention that the operation of the registration of the image (picture memorandum) picked upon as memorandum, is simple and the load of the CPU can be reduced. The reason is that the picture memorandum icon is generated and displayed automatically only for the image to be registered initially, and generation of a further icon is not performed for registering the icon. Also, no particular registering operation is required for the user.

It is the second effect of the present invention to make of the operation for the registered picture memorandum and the operation for extracting desired picture memorandum among a plurality of picture memorandum. The reason is that the first picture memorandum can be read out on the waiting screen image only by selecting the picture memorandum icon among the desktop icons on the waiting screen image and the desired picture memorandum can be extracted by only operation of the cursor key.

It is the third effect of the present invention to enable the registration of a plurality of picture memorandum without increasing the number of desktop icons. The reason is that a plurality of the picture memorandum can be registered with only a single icon.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A cellular telephone set having a camera and a display portion integrated therein, comprising:
    a cellular telephone housing;
    a radio portion located within the housing;
    a display portion located within the housing to be in opposition to a user;
    a non-film camera mounted within the housing on a back side of the display portion;
    a waiting screen within said display portion, the waiting screen having an image size corresponding to a waiting screen image;
    a memory means for registering images picked-up by said camera, in a picture memorandum mode, as picture memorandum with a size of the picked-up images being equal to the image size of the waiting screen image;
    another memory means for registering other images, taken in a non-picture memorandum mode, for an album as album images with a size of the album images being greater than the images size of the waiting screen image;
    a selection means for selecting the picture memorandum mode, and
    a registration control means for, upon selection of the picture memorandum mode, automatically generating an icon indicating that the picked-up images are registered upon initially recording said picked-up images in said memory means, displaying the icon on said display portion, and registering subsequently picked-up images in said memory means in association with said icon.

2. The cellular telephone set as set forth in claim 1, which further comprises:
    an icon display portion within said display portion and located apart from said waiting screen; and
    a display control means for, upon selection of the picture memorandum mode, controlling to display said icon on said icon display portion.

3. The cellular telephone set as set forth in claim 2, which further comprises a read-out control means for reading out one of the picked-up images registered as picture memorandum in said memory means in response to selecting operation of said icon to display on said waiting screen image.

4. The cellular telephone set as set forth in claim 3, wherein said read-out control means sequentially reads out other images subsequently registered in said memory means in association with said icon to individually display each image on said waiting screen image according to cursor operation on said display portion.

5. The cellular telephone set as set forth in claim 2, wherein the registration control means limits registration of the picked-up images recording in said memory means to a predetermined number of images in association with said generated icon.

6. The cellular telephone set as set forth in claim 5, wherein,
    said icon display portion is configured to display plural of said icons, each icon associated with a different set of said registered images picked-up by said camera, in the picture memorandum mode, as the picture memorandum with the size of the picked-up images being equal to the image size of the waiting screen image, and
    the registration control means limits generation of said icons to a predetermined number of icons.

7. The cellular telephone set as set forth in claim 1, wherein said memory means has a fixed capacity.

8. The cellular telephone set as set forth in claim 1,
    which further comprises a means for generating an alarm when a registration amount in said memory means reaches a maximum registration amount of said memory means.

9. A method of controlling operation of a cellular telephone set having integrated within a common housing, a radio portion, a non-film camera and a display portion, comprising:
    a selecting step of selecting between i) a picture memorandum mode that picks up images in a size equal to an image size of a display image portion within the display portion, and ii) a album mode that pick up images in a size greater than the size equal to the size of the display image portion within the display portion; and a registration control step, initiated by selecting the picture memorandum mode, of automatically generating an icon indicating that images are registered upon initially recording said picked-up images in a memory, displaying the icon on said display portion, and registering subsequently picked-up images in association with said icon.

10. The operation control method as set forth in claim 9, which further comprises a display control step of controlling to display said icon on an icon display portion of said display portion, said icon display portion located apart from the display image portion for the picked-up images.

11. The operation control method as set forth in claim 10, which further comprises a read-out control step of reading out one of said images registered in said memory in association with said icon, in response to selecting operation of said icon to display on a waiting screen image without resizing said one image.

12. The operation control method as set forth in claim 11, wherein in said read out control step, other images subsequently registered in said memory in association with said icon, are sequentially read out to display one at a time on said waiting screen image according to cursor operation on said display portion.

13. The operation control method as set forth in claim 10, wherein the size of said picked-up images registered in said memory is equal to the image size of waiting screen image so that the picked-up image may be later displayed in said waiting screen image without resizing.

14. The operation control method as set forth in claim 9, which further comprises a step of generating an alarm when registration amount in said memory reaches a maximum registration amount of said memory.

15. A program residing on a computer storage medium for making a computer to execute a method of controlling operation of a cellular telephone set having integrated within a common housing, a radio portion, a non-film camera and a display portion, comprising:

a selecting step of selecting between i) a picture memorandum mode that picks up images in a size equal to an image size of a display image portion within the display portion, and ii) an album mode that pick up images in a size greater than the size equal to the size of the display image portion within the display portion; and a registration control step of, initiated by selecting the picture memorandum mode, automatically generating an icon indicating that picked-up images are registered upon initially recording said picked-up images in a memory, displaying the icon on said display portion, and registering subsequently picked-up images in association with said icon.

16. The program as set forth in claim 15, which further comprises a display control step of controlling to display said icon on an icon display portion of said display portion located apart from said display image portion.

17. The program as set forth in claim 16, which further comprises a read-out control step of reading out one of said images registered in said memory in association with said icon, without resizing said one image, in response to selecting operation of said icon to display on said waiting screen image.

18. The program as set forth in claim 17, wherein in said read out control step, other images subsequently registered in said memory in association with said icon, are sequentially read out, without resizing said other images, to display on said waiting screen image according to cursor operation on said display portion.

19. The program as set forth in claim 15, which further comprises step of generating an alarm when registration amount in said memory reaches a maximum registration amount of said memory.

* * * * *